United States Patent

[11] 3,598,227

| [72] | Inventor | Arthur Stanford<br>Richmond, Va. |
|---|---|---|
| [21] | Appl. No. | 829,689 |
| [22] | Filed | June 2, 1969 |
| [45] | Patented | Aug. 10, 1971 |
| [73] | Assignee | A M F Incorporated |

[54] BELT-TRACKING COMPENSATOR
10 Claims, 4 Drawing Figs.
[52] U.S. Cl. .................................................. 198/165,
198/208
[51] Int. Cl. .......................................... B65g 15/14,
B65g 15/30
[50] Field of Search. ......................................... 198/165,
29--30, 208

[56] References Cited
UNITED STATES PATENTS

| 1,134,221 | 4/1915 | Nilsson ........................ | 198/162 UX |
| 1,333,006 | 3/1920 | Welser ........................ | 198/165 UX |
| 2,999,581 | 9/1961 | Baugh ......................... | 198/165 |
| 3,170,564 | 2/1965 | Gatto ........................... | 198/165 |

*Primary Examiner*—Edward A. Sroka
*Attorneys*—George W. Price and Barry H. Fishkin

ABSTRACT: Materials-handling apparatus, which comprises means for advancing an article along a predetermined path, conveyor means provided at the sides of said predetermined path for guiding products therealong, means for varying the spacing between at least certain portions of said side conveyor means, and means for compensating for changes in tension in said side conveyor means as the spacing between portions thereof is varied.

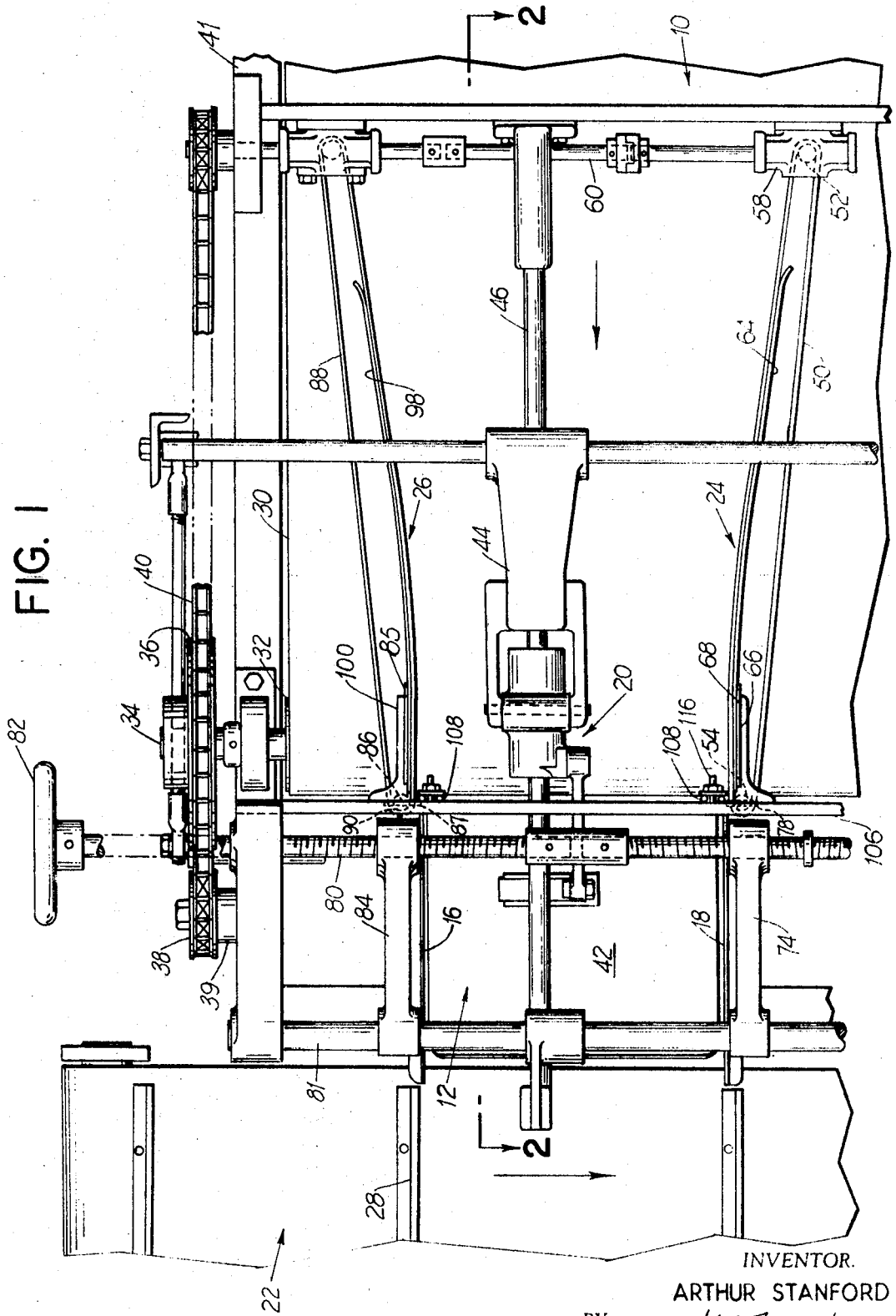

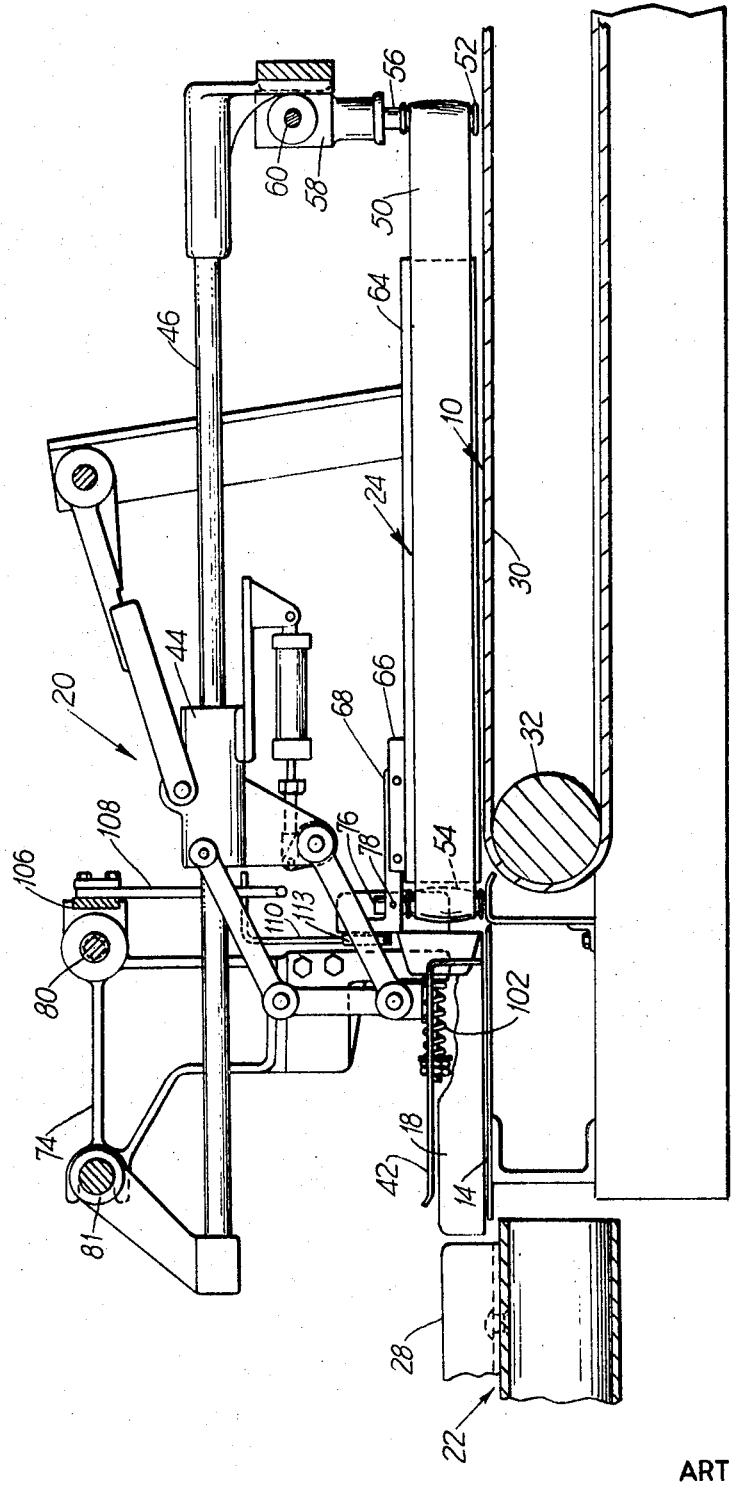

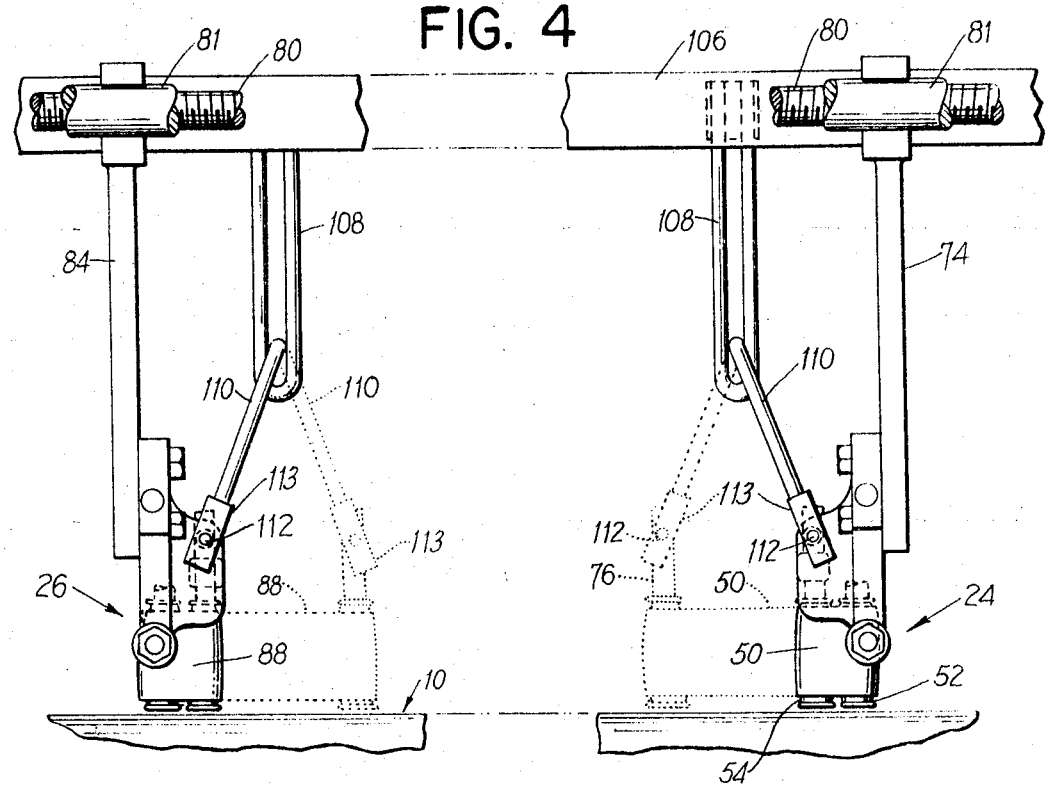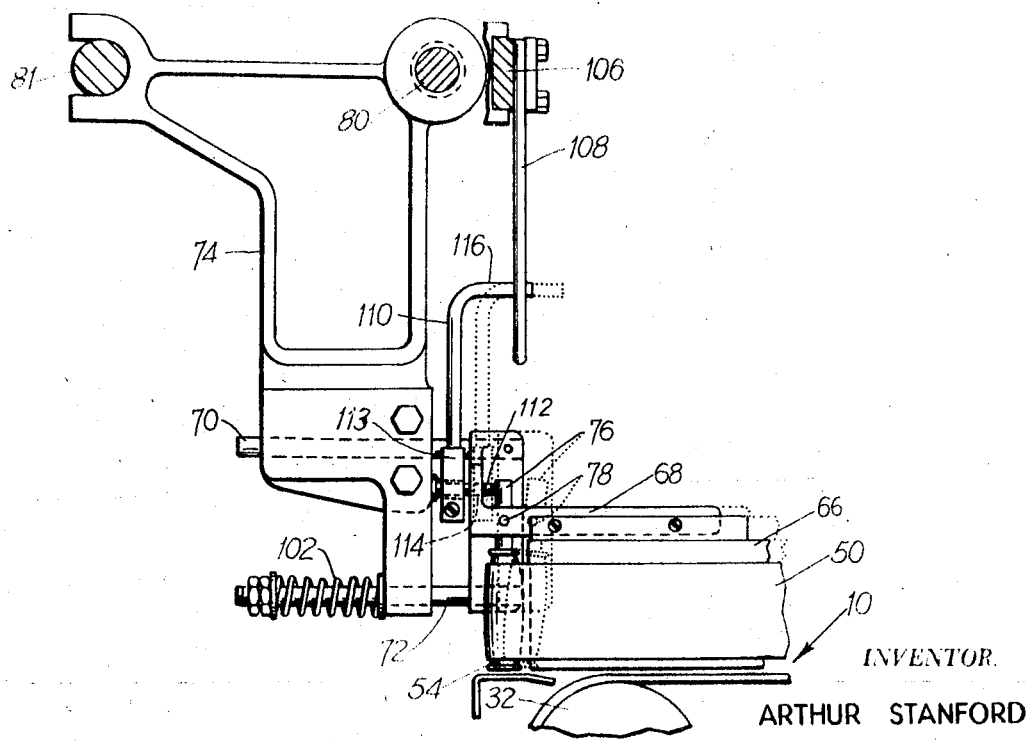

3,598,227

BELT-TRACKING COMPENSATOR

BACKGROUND

This invention relates to materials-handling and more specifically to adjustable conveyor arrangements wherein tension compensation means must be provided.

In materials-handling it is often desirable to converge the path in which products are being advanced. This is particularly the case in packaging applications where at the later stages of product infeed the products should be supported at their sides as they are advanced. The most positive side support arrangement for advancing products is the provision of vertically disposed side conveyors.

Since materials-handling equipment is often complex and expensive, it is advantageous to provide means for adjusting such equipment so that it may handle different sizes and shapes of the products rather than providing a separate machine for the different products.

In the past, it was not feasible to provide side conveyors, since an adjusting converging-diverging capability could not be effected due to the tension variances this placed in the belts. When the belts were mounted for a predetermined converging angle, adjusted the belts to a greater angle of convergence resulted in an increase of the tension in the belt. This created a propensity for the belt to climb up its vertical supports and cause a jamming of the apparatus or breakage of the belt. Conversely, when the belts were diverged from the predetermined converging angle, the tension on the belt was decreased, resulting in a propensity for the belt to slide off the bottom of its vertical supports. This also led to jamming of the apparatus or breakage of the belt.

SUMMARY

It is, therefore, an object of this invention to provide materials-handling apparatus including side conveyor belts having tension compensation means.

It is a further object of this invention to provide means in conjunction with a vertically disposed conveyor belt to maintain said belt in position on its supports as the tension on the belt is varied.

It is a still further object of this invention to provide an improved materials-handling apparatus including opposed, adjustable vertically disposed conveyor belts at the side of the products path flow.

In accordance with these and other objects, apparatus according to the invention may comprise means for advancing a product along a predetermined path, conveyor means provided at the sides of said predetermined path for guiding products therealong, means for varying the spacing between at least certain portions of said side conveyors and means for compensating for changes in tension on said side conveyor belts as they are moved with respect to each other.

DESCRIPTION OF DRAWINGS

FIG. 1 is a plan view of a preferred embodiment of apparatus incorporating the invention.

FIG. 2 is a side sectional elevation view of the apparatus taken along line 2—2 of FIG. 1.

FIG. 3 is an enlarged side elevation view of a tension compensating means incorporating the invention.

FIG. 4 is a front elevation view of the apparatus shown in FIG. 3 showing two positions of the tension compensating means.

DESCRIPTION OF PREFERRED EMBODIMENT

With reference to the drawings, apparatus including a preferred embodiment of the invention may comprise a horizontally disposed conveyor belt 10 for advancing products to the left as seen in FIGS. 1 and 2, a slot 12 at the end of conveyor 10 formed by a dead plate 14 and side guides 16 and 18, a pusher bar assembly 20 for engaging articles on the conveyor 10 and pushing them over dead plate 14 onto a further conveyor means 22 and opposed side conveyors 24 and 26 for moving and guiding articles in their movement along conveyor belt 10 so that they will fit between side guides 16 and 18.

The further conveyor means in this instance is a conveyor having adjustable flights 28 for receiving and supporting products as they are advanced to be processed. The distance between the bars that form flights 28 can be varied to suit the product being handled thereby. The particular structure involved in such an arrangement is fully disclosed in the assignee's copending application Ser. No. 763,100 entitled "Universal Bagger."

Conveyor 10 is shown as a belt 30 mounted between a roller 32 and one (not shown) spaced therefrom in a conventional manner, but it is to be understood that conveyor 10 could also be a roller conveyor, a spring conveyor, etc. Roller 32 is mounted on a shaft 34 on which a sprocket 36 is mounted. The conveyor is driven by a sprocket 38 mounted on a driven shaft 39 in spaced relationship to sprocket 36 and a chain 40 for transmitting the rotation of shaft 39 to shaft 34. Shafts 34 and 39 are mounted for rotation between the apparatus side frame members, only one of which designated 41, is shown in FIG. 1 due to space considerations.

Pusher bar assembly 20 includes a pusher bar 42 mounted on a carriage 44 that is slidably mounted for reciprocating movement on a shaft 46. The reciprocation of carriage 44 on shaft 46 is timed in conjunction with the further conveyor means 22 so that the pusher bar 42 will be operable to push articles into each flight 28 thereof as it registers with slot 12. The precise construction and operation of pusher bar assembly 20 is set forth in detail in the assignee's U.S. Pat. No. 3,106,048, issued on Oct. 8, 1963 and entitled "Apparatus for Depanning, Slicing, Dispensing and Packaging Baked Goods."

The flights 28 of the further conveyor means are shown in FIG. 1 as equal in size to the slot 12 and the distance between side guides 16 and 18 is also adjustable to provide side support for varying article sizes.

Since the size of the conveyor flights 28 and the slot 12 are adjustable, the side conveyor belts 24 and 26 must also be adjustable so that the downstream ends thereof are adjacent to slot side guides 20 and 22 to feed articles therein from conveyor 10.

Referring to FIGS. 1 and 2, side conveyor 24 includes a conveyor belt 50 mounted on two spaced vertically disposed spindles 52 and 54. Spindle 52 is mounted on a shaft 56 (FIG. 2) that is journaled in a housing 58. Housing 58 is mounted on a shaft 60 that is mounted for rotation above conveyor 10 and between the machine side frame members. Bevel gear means (not shown) are provided in housing 58 to transmit the rotary motion of shaft 60 to shaft 56 and spindle 52.

A flat tensioning springs 64 engages belt 50 as shown in FIG. 1. Tensioning spring 64 is connected by a bracket 66 to a casting 68 (FIGS. 2 and 3) which includes two rods 70 and 72 which slidably mount casting 68 to a frame member 74.

Side conveyor spindle 54 is mounted on a shaft 76 which is pivotally mounted in casting 68 by a pivot pin 78. Spindle 54 is an idler spindle as belt 50 is driven from spindle 52.

Referring once again to FIG. 1, a threaded rod 80 is rotatably mounted between the machine side frame members and a shaft 81 is mounted between the side frame members in parallel spaced relationship with threaded rod 80. The threaded rod is rotated by a handle 82 affixed thereto exterior of the machine frame. Frame member 74 is threadedly mounted on rod 80 and slidably mounted on shaft 81. The frame member is movable laterally with respect to conveyor 10 in response to rotation of handle 82. Another frame member designated 84 is also threadedly mounted on rod 80 and slidably mounted on shaft 81. The portion of rod 80 that frame member 84 is mounted on includes threads thereon that are pitched in the opposite direction than those on the portion of rod 80 that frame member 74 is mounted on.

Frame member 84 is identical to member 74 and includes thereon casting 85 that pivotally mounts a vertically extending spindle shaft 86 by a pivot pin in a manner identical to the mounting of shaft 76 in casting 68.

Side conveyor 26 includes a conveyor belt 88 mounted between a spindle 90 mounted on spindle shaft 86 and a spindle 92 mounted in spaced relationship therewith on a vertically extending shaft 94. Shaft 94 is mounted on a housing 96 supported on shaft 60 and is driven therefrom by a bevel gear arrangement (not shown). A flat tensioning spring 98 engages belt 88 in the same manner as tensioning spring 65 engages belt 50. Tensioning spring 98 is mounted to casting 85 by a bracket 100.

Thus, the two side conveyors are mounted at the front ends thereof on spindle shafts 56 and 92, which are fixed in housings 58 and 96 and are not laterally or longitudinally movable from these points. The other ends of the two side conveyors are mounted for lateral movement on threaded rod 80 and, since the threads of that rod are pitched in opposite directions for the two side conveyors, with rotation thereof, these ends of the side conveyors will move either towards of away from each other.

Lateral movement is imparted to spindles 54 and 90 through frame members 74 and 84 respectively, castings 68 and 85 respectively and pivot pins 78 and 87 respectively. Flat tension springs 65 and 98 are mounted to castings 68 and 85 respectively and exert a lateral force on the respective conveyor belts 50 and 88.

The belts 50 and 88 are sized such that a predetermined tension will be on the belts when they are converged to a predetermined angle. Thus, lateral movement away from this predetermined position in either direction will unbalance the system, as set forth hereinbelow.

As the action of threaded rod 80 moves the downstream ends of the side conveyors towards each other, flat tension springs 65 and 98 bend back and away from their respective brackets, increasing the distance between the two passes of the belts and increasing the tension in the belts 50 and 88. Under this tension, the belts exert a backforce on spindle shafts 56 and 86. This force is partially compensated for by allowing the castings 68 and 85 to move backward from frame members 74 and 84 on rods 70 and 72. This backward movement is controlled by the counterforce exerted by a compression spring 102 mounted on the respective rods 72.

However, compression spring 102 does not permit sufficient forward movement of spindles 54 and 90 to maintain the tension in the belts 50 and 88 at predetermined level. Thus, the tension in the belts increase with converging movement of the conveyors and the reaction of the belts to this increase is to "-walk up" the spindles and come off the spindles or jam the system. Conversely, when the conveyors are diverged from the predetermined position, the decrease in tension will cause the belts to "walk down" the spindles and jam the system.

To compensate for tension changes in the belts in the sense of maintaining the belts in their spindles as tension varies therein a compensating system is provided in conjunction with each spindle 54 and 90 and their respective castings and frame members.

With particular reference to FIGS 3 and 4, a rectangular rod 106 is mounted between the apparatus side frame members and supports thereon a U-shaped bracket 108 mounted adjacent each downstream side conveyor spindle. An arm 110 is pivotally mounted in each of the castings 68 and 85 by a screw 112 fixedly mounted in the base portion 113 thereof and threadedly mounted in a threaded aperture 114 in the casting. The end of screw 112 bears against the tops of the spindle shaft associated therewith above the pivot point thereof and thus controls its angular attitude. In addition, each arm 110 has a horizontally extending portion 116 that is mounted in the respective bracket 108.

Referring now to FIGS. 3 and 4, as the casting is moved laterally by rotation of threaded rod 80 to diverge or converge the side conveyors, arm portion 116 remains fixed in the lateral sense by its capture in bracket 108, with the base portion 113 thereof moving with the casting. This movement is a modified pendulum arch, modified by the fact that base portion 113 moves in a straight line laterally, with the length being compensated for by a rise of horizontal portion 116 in bracket 108 as the arm 110 approaches vertical.

More importantly, the modified arcuate movement of the arms 110 pivots the screws 112 in the respective apertures 114. This advances or retracts the screws in their apertures, depending on the direction of movement of the arm. The pitch of the threads on the screws 112 and in apertures 114 are selected for angle and distance such that as the side conveyors are converged and tension increases in the belts, creating the propensity for them to walk up their spindles, screws 112 are retracted in apertures 114 by the pivoting of arms 110. This, coupled with the force of compression spring 102, pivots the top of the spindle shafts backward to resist the propensity of the belts to walk up the spindle. This backward pivot of the spindle shaft increases as the tension on the belts increases to keep the belts in equilibrium. Since the arms 110 associated with the two conveyors pivots in opposite directions as the belts are converged, to achieve identical pitching by the two spindle shafts 78 and 86, the thread of the screws 112 associated with conveyor 24 is a left hand thread and that associated with conveyor 26 is a right-hand thread.

conversely, as the side conveyors are diverged from their predetermined angle of convergence, the lateral movement of casting 68 and 85 will cause arms 110 to pivot in the other direction, advancing the screws 112 in the respective apertures 114 and tilting the top of the spindle shafts forward. This resists the propensity of the belts to walk down the spindles in response to the lessening of tension therein and keeps the belts in equilibrium.

Having now fully set forth both structure and operation of preferred embodiments of the concept underlying the present invention, it may be that various other embodiments as well as certain variations and modifications of the embodiments herein shown and described will occur to those skilled in the art upon becoming familiar with said underlying concept. All such embodiments, variations, and modifications as incorporate the spirit of the invention and depend upon its underlying concept are consequently to be considered as within the scope of the claims appended herebelow, unless the claims by their language expressly state otherwise.

I claim:

1. Materials-handling apparatus, which comprises:
   means for advancing an article along a predetermined path,
   a conveyor provided at each side of said predetermined path for guiding products therealong,
   means mounting one end of at least one of said side conveyors for movement towards and away from the corresponding end of the other side conveyor, said movement changing the tension in the side conveyor, and
   means responsive to said movement of the end of the side conveyor for varying the attitude of the conveyor mounting means to compensate for the change in tension.

2. Materials-handling apparatus according to claim 1, wherein
   both of said side conveyors are mounted at the upstream ends thereof for movement of the downstream ends towards and away from each other for the side conveyors.

3. Materials-handling apparatus according to claim 1, wherein:
   each of the side conveyor means includes a pair of spaced supports and a belt mounted therebetween.

4. Materials-handling apparatus according to claim 3, wherein said means for compensating for changes in tension in said side conveyor means includes:
   supports for pitching movement about a pivot pin mounted therein; and
   means for pitching said support about said pivot pin in response to movement of the ends of the side conveyors towards and away from each other.

5. Materials-handling apparatus, which comprises:

a pair of spaced, generally vertically disposed, spindle shafts, means mounting one of said spindle shafts for pitching movement about a generally horizontal axis, a spindle mounted on each of said spindle shafts, a conveyor belt mounted between said spindles, means for varying the tension in said conveyor belt, and means for pitching said one of said spindle shafts in response to variance in the tension in the conveyor belt to maintain the conveyor belt on the spindles.

6. Materials-handling apparatus according to claim 5, further comprising:

a second conveyor belt is mounted in an identical manner between spaced, generally vertically disposed, spindles and disposed opposite the first conveyor belt, means for advancing articles along a predetermined path between the vertically disposed conveyor belts, means mounting said pitchable spindle shafts for movement towards and away from each other, and means mounting the other of the spindle shafts for pivotal movement about their generally vertical axes such that movement of the pitchable spindle shafts will adjust the two conveyor belts to varying degrees of convergence.

7. Materials-handling apparatus according to claim 6, wherein the means for mounting said pitchable spindles for movement towards and away from each other includes:

a threaded rod mounted above and transversely of said predetermined path, and casting means adapted to receive said spindle shafts mounted on said threaded rods, said threaded rods being threaded in the opposite direction for the two casting means.

8. Materials-handling apparatus according to claim 7, wherein:

each of said castings includes a threaded aperture above and in parallel spaced relationship with the generally horizontal axis about which the spindle shaft is pitchable, and a screw is mounted in said threaded aperture and engageable with the spindle shaft.

9. Materials-handling apparatus according to claim 8, wherein said means for pitching said spindle in response to variance in the tension in the conveyor belt includes means for rotating the screws in each of the castings in response to lateral movement of said castings.

10. Materials-handling apparatus according to claim 9, wherein said means for rotating the screws includes:

a bracket fixedly mounted adjacent each casting, an arm mounted at one end thereof to said screw and receivable at the other end thereof in said bracket such that the arm will rotate the screw as the casting is moved laterally with respect to the bracket.